United States Patent
Calzone et al.

(10) Patent No.: US 7,831,989 B1
(45) Date of Patent: Nov. 9, 2010

(54) INTELLIGENT ASSET MANAGEMENT IN A CABLE SERVICES SYSTEM

(75) Inventors: Steve Calzone, Duluth, GA (US); Nishith Sinha, Mableton, GA (US); Terry Lee, Atlanta, GA (US)

(73) Assignee: Cox Communications, Atlanta, GA (US)

( * ) Notice: Subject to any disclaimer, the term of this patent is extended or adjusted under 35 U.S.C. 154(b) by 1112 days.

(21) Appl. No.: 11/035,678

(22) Filed: Jan. 13, 2005

Related U.S. Application Data

(60) Provisional application No. 60/536,331, filed on Jan. 13, 2004.

(51) Int. Cl.
*H04N 7/173* (2006.01)
*H04L 12/54* (2006.01)

(52) U.S. Cl. ............... 725/92; 725/87; 725/91; 725/95; 725/96; 370/428; 370/429

(58) Field of Classification Search ............. 725/1–153; 370/429, 428
See application file for complete search history.

(56) References Cited

U.S. PATENT DOCUMENTS

| | | | |
|---|---|---|---|
| 5,815,195 A | 9/1998 | Tam ............................ 725/86 |
| 6,177,931 B1 | 1/2001 | Alexander et al. ............ 725/52 |
| 6,275,268 B1 | 8/2001 | Ellis et al. .................... 348/564 |
| 6,438,596 B1 * | 8/2002 | Ueno et al. ................... 709/226 |
| 6,639,975 B1 | 10/2003 | O'Neal et al. .......... 379/112.01 |
| 6,718,551 B1 | 4/2004 | Swix et al. ..................... 725/32 |
| 7,076,544 B2 * | 7/2006 | Katz et al. .................... 709/223 |
| 7,114,170 B2 | 9/2006 | Harris et al. |
| 7,428,503 B1 | 9/2008 | Groff et al. .................... 705/26 |
| 2001/0014975 A1 * | 8/2001 | Gordon et al. ................ 725/91 |
| 2002/0049624 A1 | 4/2002 | Raveis ............................ 705/8 |
| 2002/0049977 A1 * | 4/2002 | Miller et al. ................... 725/82 |
| 2002/0059602 A1 | 5/2002 | Macrae et al. |
| 2002/0069420 A1 * | 6/2002 | Russell et al. ................. 725/92 |
| 2002/0078453 A1 | 6/2002 | Kuo ............................. 725/46 |
| 2002/0129375 A1 * | 9/2002 | Kim et al. ..................... 725/100 |
| 2002/0169656 A1 | 11/2002 | Al-Azzawe .................. 705/10 |
| 2003/0046700 A1 | 3/2003 | Wilcox et al. ................. 725/60 |
| 2003/0084449 A1 | 5/2003 | Chane et al. .................. 725/46 |
| 2003/0200159 A1 | 10/2003 | Kay et al. ...................... 705/28 |
| 2003/0229898 A1 | 12/2003 | Babu et al. .................... 725/87 |

(Continued)

OTHER PUBLICATIONS

U.S. Appl. No. 10/885,292, filed Dec. 2, 2004, entitled "Preparation and Utilization of Customer Profile Data in a Cable Services Network".

(Continued)

*Primary Examiner*—John W Miller
*Assistant Examiner*—Gigi L Dubasky
(74) *Attorney, Agent, or Firm*—Merchant & Gould

(57) ABSTRACT

Methods and systems are provided for intelligently managing on-demand content in a cable services system. High demand video programs (e.g., movies, documentaries, mini-series, educational films, and the like) are stored at cable system hubs that service a number of individual cable customers. When a given video program is requested, the requested title is steamed from the hub servicing the requesting customer rather than streaming the requested program from the cable system head end. The video programs cached at the cable system hubs are determined based on attributes associated with individual video programs including time since initial release, association with other programs, association with hub locations, association with current events, and the like.

20 Claims, 7 Drawing Sheets

U.S. PATENT DOCUMENTS

| | | |
|---|---|---|
| 2004/0187159 A1* | 9/2004 | Gaydos et al. ................. 725/92 |
| 2005/0160458 A1 | 7/2005 | Baumgartner ................. 725/46 |
| 2005/0172325 A1 | 8/2005 | Henry et al. ................. 725/116 |
| 2005/0256952 A1 | 11/2005 | Mouhanna et al. .......... 709/223 |
| 2006/0248555 A1 | 11/2006 | Eldering ....................... 725/34 |
| 2006/0293971 A1 | 12/2006 | Hunter et al. ................. 705/26 |

OTHER PUBLICATIONS

U.S. Appl. No. 11/002,912, filed Dec. 2, 2004, entitled Customer Support Services via a Cable Services Network.

U.S. Office Action dated Aug. 20, 2007 cited in U.S. Appl. No. 11/002,913.

U.S. Office Action dated Feb. 22, 2008 cited in U.S. Appl. No. 10/885,292.

U.S. Final Office Action dated Oct. 15, 2008 cited in U.S. Appl. No. 10/885,292.

U.S. Office Action dated Nov. 13, 2008 cited in U.S. Appl. No. 11/002,912.

U.S. Office Action dated Oct. 26, 2009 cited in U.S. Appl. No. 10/885,292.

U.S. Final Office Action dated Jun. 18, 2010 cited in U.S. Appl. No. 10/885,292.

* cited by examiner

INTELLIGENT ASSET MANAGEMENT IN A CABLE SERVICES SYSTEM

RELATED APPLICATIONS

This application claims the benefit of U.S. Provisional Application Ser. No. 60/536,331, filed with the United States Patent and Trademark Office on Jan. 13, 2004, entitled "Intelligent Asset Management for Hybrid On-Demand Architecture."

FIELD OF THE INVENTION

The present invention generally relates to intelligent asset management in a cable services system. More particularly, the present invention relates to intelligent asset management for video-on-demand services in a cable services system.

BACKGROUND OF INVENTION

With the advent of cable television networks, cable customers have grown accustomed to receiving a variety of television programming from numerous broadcasting sources. In recent years, technology advances have enabled customers to receive an even greater variety of services through cable services networks. Modern cable services networks provide traditional video television programming, telephone services, high speed Internet access, electronic mail services, video-on-demand, information services, and the like. Through the use of set-top boxes (computing systems) cable services providers, also known as multiple system operators (MSO), can provide interactive television services to customers. Such interactive television services allow customers to interact directly with services providers in response to services and product offerings presented to the customers through their personal television sets.

Video-on-demand (VOD) allows cable services customers to request certain video programming to be played on their local television sets via customer set-top boxes at a time desired by customers. In a typical setting, a customer may select a desired movie, documentary, educational film, and the like from a list of titles displayed on the customer's television set via the set-top box.

According to prior systems, selected video programming titles are streamed from a cable system head end to the customer's set-top box and television set via a cable system hub that services a number of individual cable customers. That is, each requested video programming title is streamed from the cable system head end out to the requesting customer. Unfortunately, the streaming of individual titles to individual customers from the cable system head end consumes a significant amount of processing capacity at the head end, and transmission of the requested title from the cable system head end out to a servicing hub consumes a significant amount of transmission capacity between the head end and the servicing hub. Indeed, the streaming of a single movie may consume on the order of 3.75 megabits per second of processing and transmission capacity. Because assets of the cable system head end are tasked with many other services, such as traditional video television programming, television services, high speed internet access, electronic mail services, cable system management and maintenance services, and the like, use of the cable system head end for video-on-demand processing and transmission for each requested video programming request is inefficient and is overly burdensome on the head end system.

It is respect to these and other considerations that the present invention has been made.

SUMMARY OF THE INVENTION

Embodiments of the present invention solve the above and other problems by providing an intelligent asset management system in a cable services system. According to one aspect of the invention, high demand video programming (e.g., movies, documentaries, mini-series, educational films, and the like) are stored at cable system hubs that service a number of individual cable customers. When a given video program (hereafter "title") is requested, the requested title is steamed from the hub servicing the requesting customer rather than streaming the requested title from the cable system head end.

According to another aspect of the invention, titles stored at the cable system head end are flagged or marked based on certain attributes such as the age of the title or recent demand for the title. If the title is a new release, or if the title is otherwise in high demand, the title is stored at certain cable system hubs for subsequent provision to requesting customers. If a title not cached at a given cable system hub is requested more than a threshold number of times in a given time period, the requested title may be cached at the requesting hub. Similarly, if a given title cached at a given hub is not requested at least a threshold number of times during a given period, the given title may be deleted from cache at the associated hub to create storage capacity for other titles.

According to aspects of the invention, a number of methods for intelligently managing assets/content include predictive propagation; on demand simultaneous propagation and streaming; and on demand simultaneous propagation and streaming with partial predictive propagation.

These and other features and advantages, which characterize the present invention, will be apparent from a reading from the following detailed description and a review of the associated drawings. It is to be understood that both the foregoing general description and the following detailed description are exemplary and explanatory only and are not restrictive of the invention as claimed.

DETAILED DESCRIPTION

Figure 1:
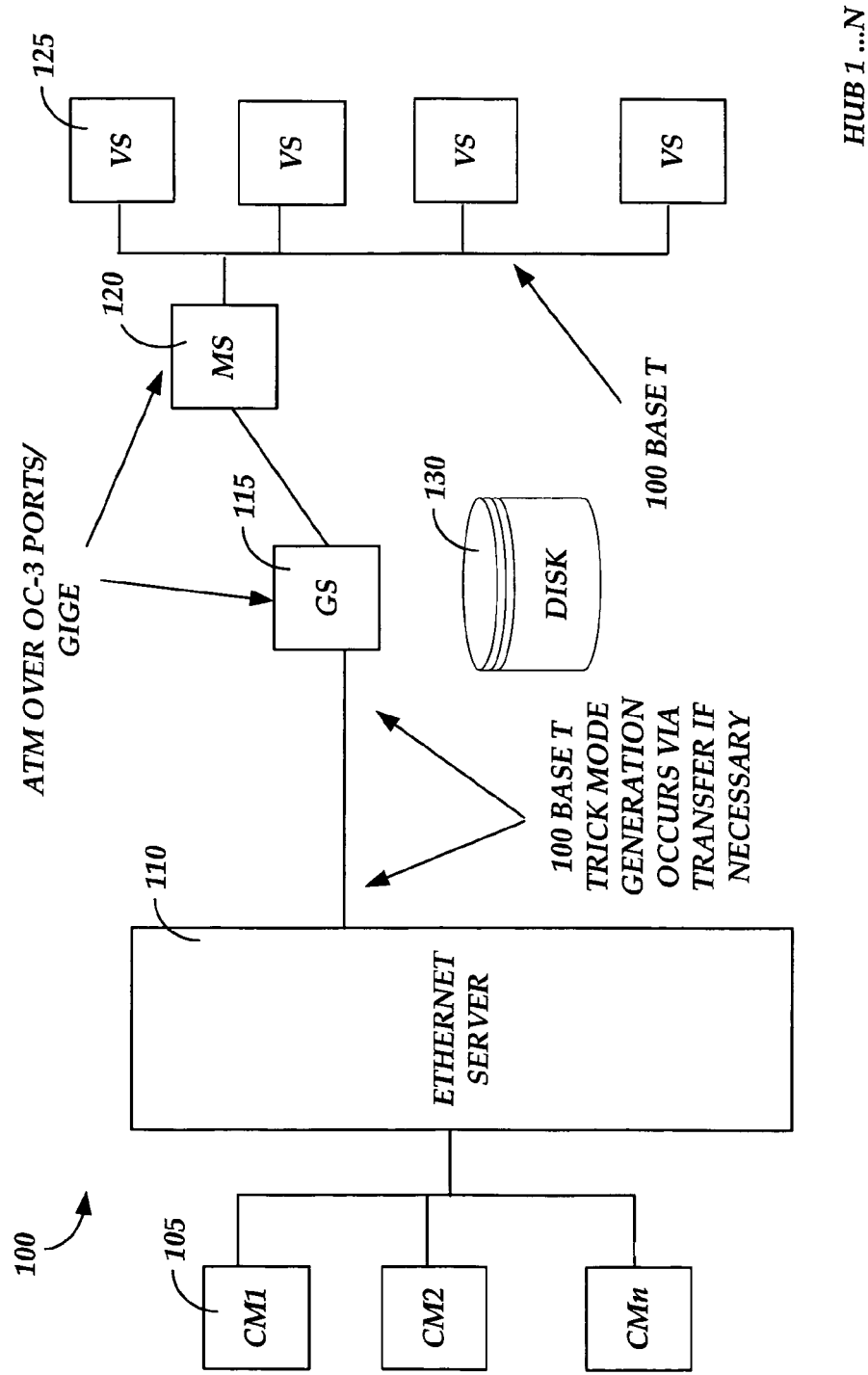
FIG. 1 is a simplified block diagram illustrating a video-on-demand/interactive television architecture according to a fully distributed architecture.

As briefly described above, embodiments of the present invention are directed to methods and systems for intelligently managing video-on-demand assets in a cable services system. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals referred to like elements throughout the several figures, aspects of the present invention will be described.

FIG. 1 is a simplified block diagram illustrating a video-on-demand/interactive television architecture according to a fully distributed architecture. As illustrated in FIG. 1 the distributed architecture includes a number of components, described below, including the catcher's mitt (CMx) 105, which is a digital content reception device from satellite, the global server (GS) 115 at the head end 410, which is responsible for propagating content, the master server (MS) 120 at a given hub site, and video servers (VS) 125. The video-on-demand/interactive television (VOD/iTV) architectures deployed to date can be categorized into three basic types: distributed, centralized, and hybrid, each of which possesses distinct differences in the location and amount of storage and streaming capacity. In a distributed architecture, all of the content is replicated across every video server in both the head end and subtending hubs and video is delivered locally from each site. This approach has the advantage of reducing overall transport requirements and is in general less difficult to roll out for time-to-market purposes. However, this approach does have some disadvantages, which include increased storage requirements as several copies of a single piece of content are necessary; increased overall video server cost; and limited scalability.

Figure 2:
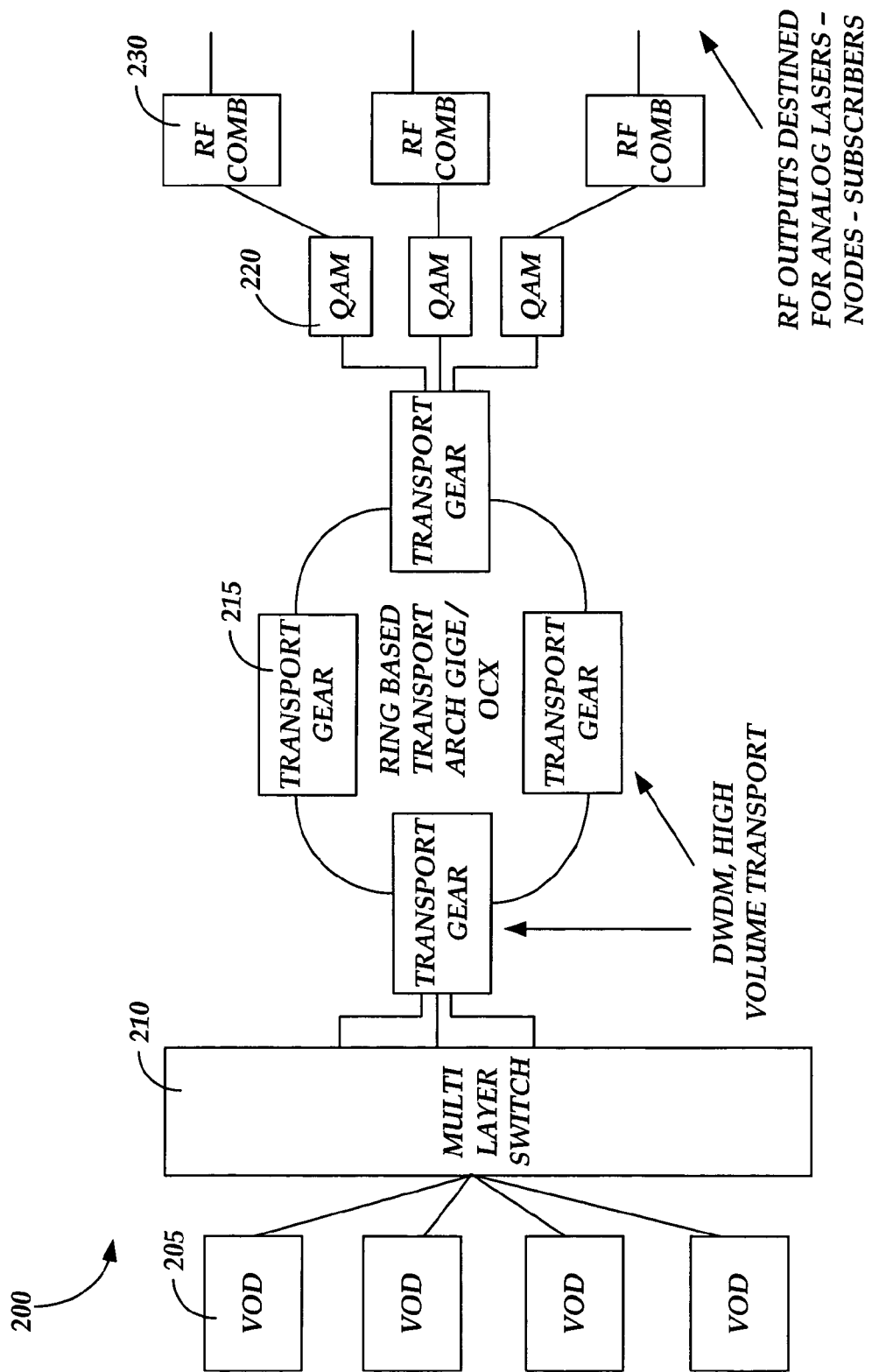
FIG. 2 is a simplified block diagram illustrating a video-on-demand/interactive television architecture according to a centralized video-on-demand distribution architecture.

On the opposite end of the spectrum, as illustrated in FIG. 2, is the centralized architecture, which in effect consolidates all of the streaming and storage capacity into a single or small set of locations (e.g., regional head-ends or primary hubs). This approach has several advantages that include reduced server costs; more efficient utilization of VOD resources 205; and potentially lower operational costs. These advantages are gained at the expense of generally large transport bandwidth requirements between the content delivery site(s) and the hubs to which it connects.

Figure 3:
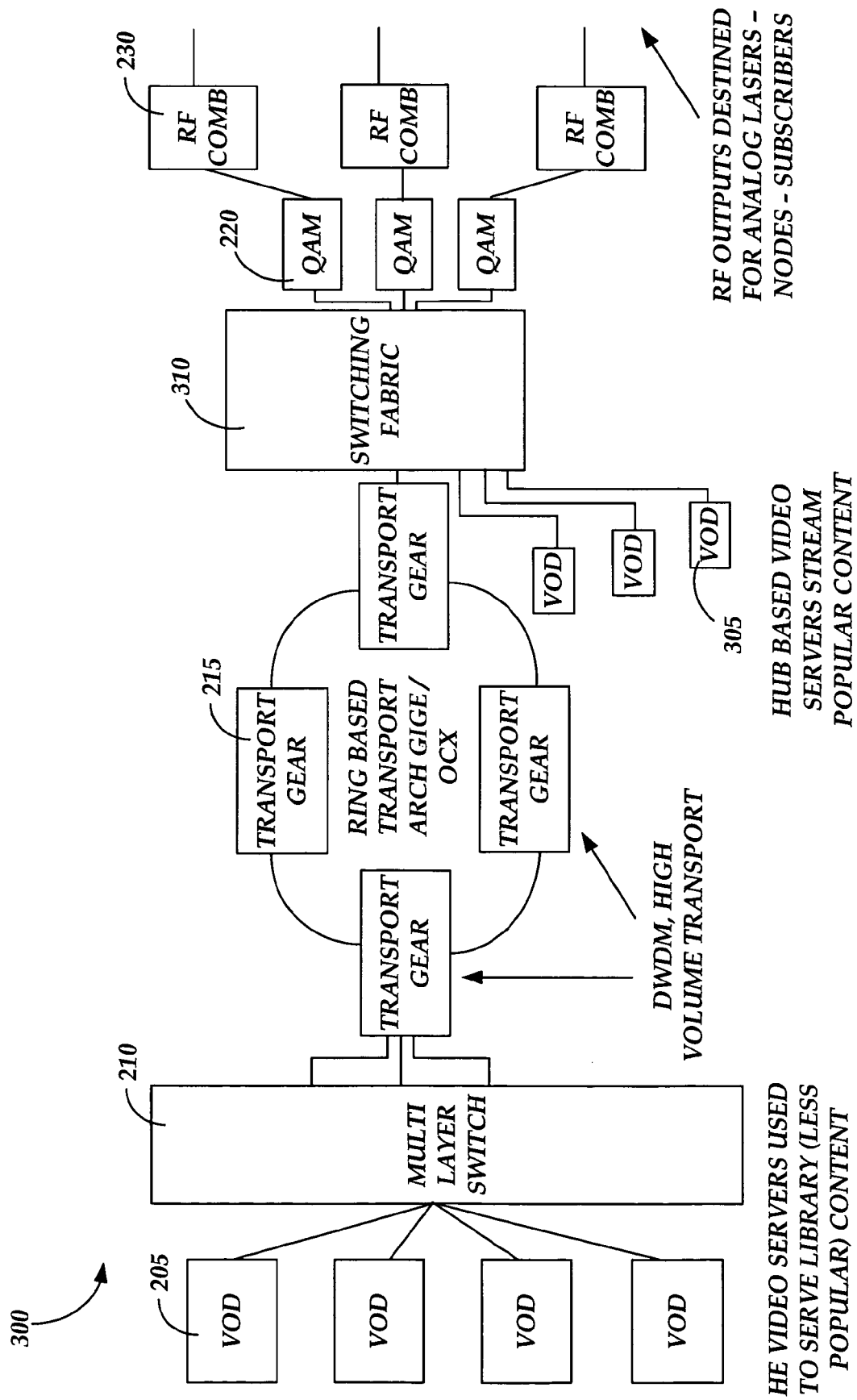
FIG. 3 is a simplified block diagram illustrating a video-on-demand/interactive television architecture according to a hybrid video-on-demand distribution architecture

In the hybrid approach, as illustrated in FIG. 3, essentially a combination of the distributed and centralized architectures, storage and streaming capacity is placed at both the head-end and hubs. The head-end capacity represents a large video/content library while the hubs contain "caching" servers for frequently viewed content. This type of architecture can reduce the transport bandwidth requirements and can enhance overall reliability as the centralized servers can effectively back-up the hub servers. However, content management can be become complicated using this approach.

While a preferred architectural choice for cable services provider may be a function of many variables that include, but are not limited to the number and location of hubs; the number of homes passed per hub and expected utilization; available power, cooling, and rack space within the hubs and head-end (s); available fiber in the ground between the head-end and hub sites; and existing transport solutions, many cable services providers have chosen the distributed approach for the reasons mentioned above. Due to the limited scalability of this type of architecture, those services providers will in the near future need to migrate to hybrid architectures to support increased content volumes. Efficient operation within this architecture relies upon effectively managing the assets between the head-end and hub locations.

As mentioned above, the primary driver for migration to a hybrid from a distributed architecture is its limited scalability, most notably in the area of content storage. While several video servers are now offering the ability to store hundreds of hours of content (e.g., >800 hours) this was not always the case. The following table 1 illustrates the need for increased storage with a service mix representative of a typical level of service offered by many services providers.

TABLE 1

Content types and approximate storage and delivery characteristics

| Content Type | Total Active Hours | Refresh rate/wk | Lead Time | Availability window |
|---|---|---|---|---|
| Movies on Demand | 500 | ~20% | ~2 wks | 5 wks |
| FreeZone (free on demand content some of which sponsored by advertisers) | 100 | ~6% | ~2 wks | 16 wks |
| Basic SVOD (subscription based programming targeted at kids, sports fans, etc.) | 200 | ~5% | ~1 wk | 20 wks |
| Third Party (e.g., Home Box Office) Subscriptions | 150 | ~25% | ~1 wk | ~4 wks |
| Third Party (e.g., Showtime) Subscriptions | 150 | ~25% | ~1 wk | ~4 wks |
| Third Party (e.g., Cinemax) Subscriptions | 150 | ~25% | ~1 wk | ~4 wks |
| Adult Entertainment | 150 | ~25% | ~1 wk | ~4 wks |
| Total hours of active content | 1400 | | | |
| Total storage required (including amount required to account for content lead times - staging) | ~1762 | | | |

Despite the seemingly modest total storage requirement, this amount easily eclipses the storage capacity of many video servers (e.g., 800 hours) that comprise an embedded base installed in present distributed architectures. Augmenting capacity across all servers is generally a very costly endeavor as increasing overall storage in a single server could potentially require the replacement of all disks due to potential interoperability problems with heterogeneous disk types (i.e., disks with differing capacities). Moreover, this is only a short-term fix, as content volumes typically increase with time. Additionally, the amount of content that will require propagation will grow beyond what can be supported by the delivery network and/or server propagation output. Based on the foregoing, utilizing a hybrid architecture rather than an incumbent distributed architecture is necessary to cost effectively support increased content volumes.

In addition, it may be beneficial to migrate to hybrid architectures even in the case of an incumbent centralized architecture. This is especially the case if video bandwidth is being shared across several competing services (i.e., telephony, HSD, etc.) It is very likely that the incremental revenue gained from other services per unit of bandwidth relinquished from on-demand streaming capacity is greater than that which would have been garnered by the on-demand services. As should be appreciated, there is some level of bandwidth at which it will make business sense to invest in storage and streaming capacity at one or more hub sites.

Given the need for hybrid architectures as described above, especially to overcome the scalability issues exhibited by distributed architectures, effectively managing assets within this architecture becomes important to ensure efficient operation. Before description of embodiments of the present invention below, it is advantageous to discuss exemplary terms associated with the architecture of the present invention. According to embodiments, an asset may be considered as anything that consumes system resources and can be requested by and delivered to a customer in real time. Essentially, an asset may be any form of stored digital media. Assets may include, but are not limited to, various types of video, HDTV content (i.e., HD-VOD), interactive games, music, long format advertising content and templates, advertisements for insertion, etc. System resources are any consumable resources related to the content distribution infrastructure on an interactive (2-way) cable plant. Examples of system resources include the following in band/out of band bandwidth, transport bandwidth, available edge bandwidth (e.g., quadrature amplitude modulation (QAM) resources), available storage capacity across head end library servers, local hub servers, etc., central processor unit (CPU) utilization on video servers, etc. An asset consumes system resources and this consumption may be dynamic in nature across one or more system resources.

According to embodiments of the present invention, the basic functional requirements for an intelligent asset management system of the present invention include functionality to intelligently propagate assets to ensure timely availability at required locations within a cable plant (i.e., hubs) while simultaneously minimizing the consumption of available system resources (e.g., transport bandwidth, hub storage). The system further includes functionality for responding to stochastic usage behavior by dynamically balancing the content load across the head end and subtending hubs based upon a cable services provider-defined cost function to maintain a defined level of system resource use (e.g., transport bandwidth, Hub storage, etc.). The system of the present invention further employs historical usage patterns to refine its efficacy in asset propagation and dynamic load balancing. Additionally, the system provides service provider defined reports indicating its use of system resources, efficiency and effectiveness in propagating and load balancing content, etc.

According to embodiments of the present invention, a number of are considered and dimensioned when planning the introduction of a hybrid resource/asset on demand architecture. Head end storage capacity represents the aggregate storage capacity at the head end to support all content, both library and popular. This parameter is essentially the same across all of the architectural approaches discussed above. This parameter is dependent on a number of variables including a number of offered services, a total number active hours of content for each service, a refresh rate for each service, an average time prior to start of availability window for each service, and a storage architecture supported by video servers. In order to support required minimum storage across all head end streams, some sever vendors may require additional storage capacity. According to one embodiment, an approximation for the minimum aggregate storage that must be available to all streams originating from the head end may be expressed as follows:

$$S_{min} = \sum_{i=1}^{k} c_i r_i (d_i + w_i)$$

where:

$S_{min}$=approximation for the minimum aggregate storage capacity at head end;

$c_i$=simultaneously available hours of content at any given time for service i;

$r_i$=refresh rate per week (i.e., amount of content that is refreshed per week) as percentage of available content ($c_i$) for service i;

$d_i$=Average time prior to start of availability window that service (i) is received;

$w_i$=Average length of availability window for service (i); and i=Index of offered services (1 . . . k).

The hub storage capacity represents the local content storage that must be available to a given hub (i.e., accessible by all hub streams) to house "popular" content. Popular content may be defined to be that number of hours/titles that account for approximately 80% of the total usage volume at a given hub during a given time period. The given time period may be a services provider-defined parameter that is determined by statistically similar request volumes and content type selection. For example based on example samples of empirical data, a typical time period may be a 4-hour block. This parameter will vary based upon the chosen implementation architecture, described above, and is a function of a number of variables, including an expected number of hours of popular content within each service type, an average time a given title remains popular, a number of services, a refresh rate for each service, and an average time prior to start of availability window for "popular" content. According to an embodiment, if the hybrid architecture is being migrated to from an incumbent fully distributed architecture, hundreds of hours of content storage may already exist that can easily be exploited. In many cases, no storage augmentation at the hub sites is required to support the change in architecture.

According to embodiments of the present invention, head end streaming capacity refers to the aggregate peak bandwidth required to support the streaming of content from the head end to all hub sites. This parameter is highly dependent upon the actual implementation architecture of the intelligent asset management system described above. The propagation bandwidth refers to the aggregate bandwidth required from the head end to all hubs to support both the initial propagation of content and its dynamic movement in response to usage patterns. The propagation bandwidth is also dependent upon the architectural approach chosen for implementation, as described above.

Figure 4:
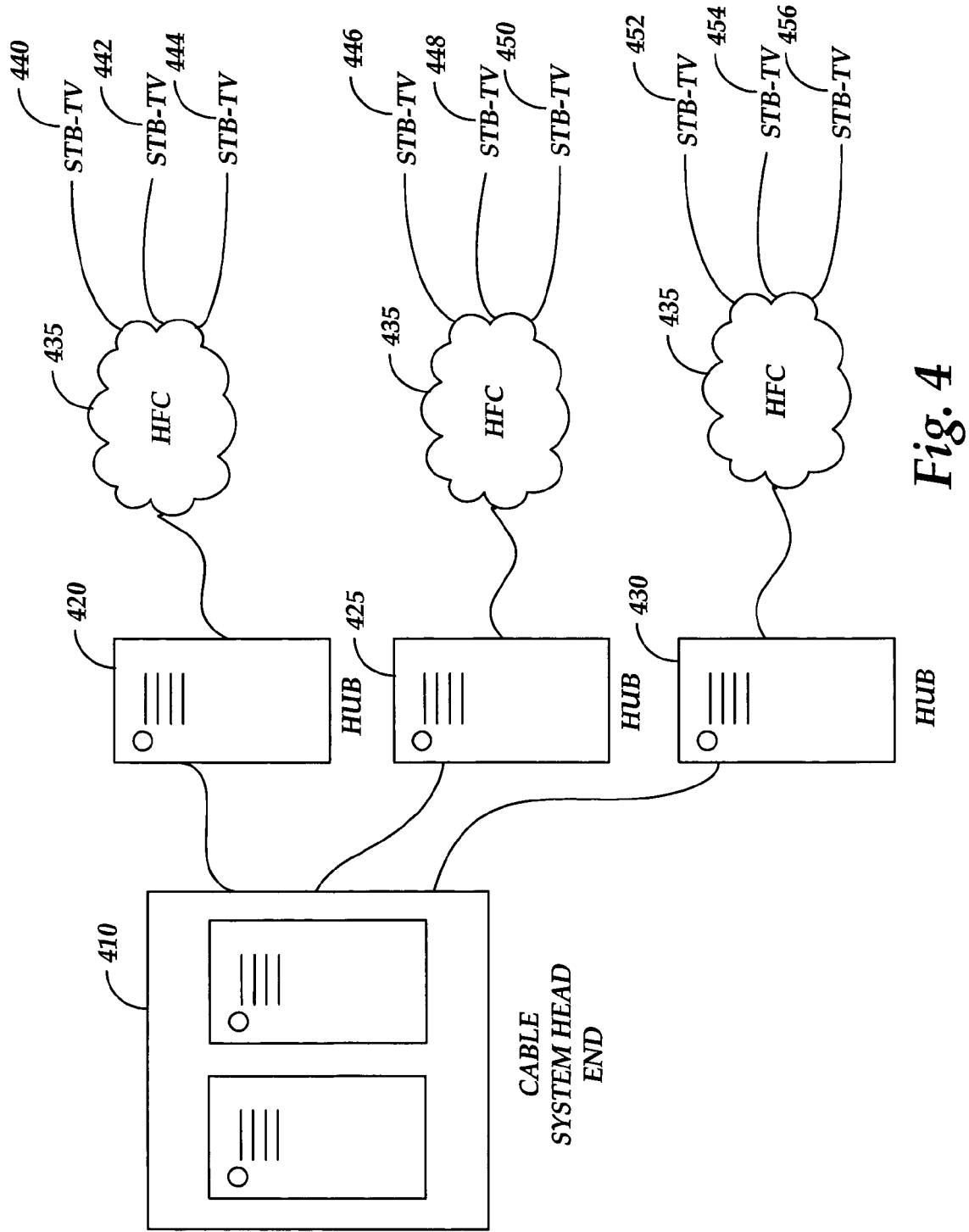
FIG. 4 is a simplified block diagram illustrating a cable services network architecture that services as an exemplary operating environment for the present invention.

Embodiments of the present invention may be implemented in a number of distributed computing environments where functionality is tailored for providing video-on-demand services and other content to individual customers/subscribers. According to an actual embodiment, the present invention is implemented in a cable television/services system. FIG. 4 is a simplified block diagram illustrating a cable services network architecture that services as an exemplary operating environment for the present invention.

Referring now to FIG. 4, digital and analog video programming, information content and interactive television services are provided via a hybrid fiber coax (HFC) network 435 to a set-top box/television set combination 440, 446, 452 for consumption by a cable television/services system customer. As is known to those skilled in the art, HFC networks 435 combine both optical fiber and coaxial cable lines. Typically, optical fiber runs from the cable head end 410 to neighborhoods of 500 to 2,000 customers. Coaxial cable runs from the optical fiber feeders to each customer. According to embodiments of the present invention, the functionality of the HFC network 435 allows for efficient bidirectional data flow between the client-side set-top box and server-side application servers located at a cable system head end 410.

According to embodiments of the present invention, the cable services system is in the form of a distributed client-server computing system for providing video and data flow across the HFC network 435 between server-side services providers (e.g., cable television/services providers) via a server-side head end 410 and client-side customer via client-side set-top boxes (STB) functionally connected to a customer receiving device, such as a television set. As is understood by those skilled in the art, modern cable services systems may provide a variety of services across the HFC network 435 including traditional digital and analog video programming, telephone services, high speed Internet access, video-on-demand, and information services.

As illustrated in FIG. 4, according to a typical cable services system, the cable system head end 410 provides cable services to individual customers via a plurality of hubs 420, 425, 430. A given hub 420, 425, 430 may in turn provide cable services over the HFC network 435 to a number of individual cable services customers via their local set-top box/television set combinations 440, 442, 444, as described below. For example, a given hub 420 may be situated for providing cable services to all cable services customers in a given neighborhood, community, or city. For example, the hub 420 may be situated for providing cable services to cable services customers situated in San Diego, Calif. The hub 425 may be situated for providing cable services to cable services customers in New York, N.Y. The hub 430 may situated for providing cable services to cable services customers in Chicago, Ill.

As should be understood by those skilled in the art, the hub configurations described herein are for purposes of example only and are not limiting of the number and combinations of hubs that may be necessary depending on the population size distribution and density of a given cable services market. Accordingly, cable services are distributed from and managed from the cable system head end 410 through the various hubs 420, 425, 430, to individual cable services customers over the HFC network 435. As is well known to those skilled in the art a head end 410 may serve as a hub for a given services market, and a given hub may serve as a head end for another hub. For example a hub serving one market, for example, San Diego, may serve as a head end for a hub serving another market, for example, Los Angeles.

On the client side of the cable services system, digital and analog video programming and digital and analog data are provided to the customer via set-top box/television combinations 440, 446, 452. Interactive television services that allow a customer to input data to the cable services system, for example selection of a video-on-demand title, likewise are provided by the set-top box/television combinations. As is known to those skilled in the art, set-top boxes are multipurpose computing devices having a computer processor, memory and an input/output mechanism. The input/output mechanism receives input from server-side processes via the HFC network 435 and from customers via input devices such as remote control devices and keyboards. Set-top boxes pass digital and analog video and data signaling to associated television sets via a one-way communication transport between the set-top box (STB) and the television. An STB may receive video and data from the server side (head end 410) of the cable services system via the HFC network 435 through a video/data downlink and data via a data downlink. The STB may transmit data from the client side of the cable services system to the head end 410 via the HFC network 435 via a data uplink. For a detailed description of cable services systems and networks as described herein, see U.S. patent application Ser. No. 10/885,292, filed with the United States Patent and Trademark Office Jul. 2, 2004, entitled "Preparation and Utilization of Customer Profile Data in a Cable Services Network" which is incorporated herein by reference as if fully set out herein.

As briefly mentioned above, according to prior methods and systems, video-on-demand and other on-demand content is streamed directly from the cable system head end 410 to individual customers via a given hub 420, 425, 430. That is, according to prior methods and systems, when a cable services customer desires a selected on-demand video program from his/her set-top box/television combination 440, the requested on-demand title is streamed directly from the cable system head-end 410 to the customer's set-top box/television combination 440 via the associated hub 420. According to embodiments of the present invention, high demand titles are cached at individual hubs 420, 425, 430 for distribution to individual cable services customers via their set-top box/television combinations 440, 446, 452. Thus, according to embodiments of the present invention, when a given title is requested by a cable services customer that has been cached at an associated hub 420, 425, 430, the selected title is streamed directly from the hub to the requesting customer without having to be streamed from the cable system head end 410. Thus, processing and transmission capacity of the head end 410 is available for other cable services system operations and activities.

As video-on-demand titles are populated onto the cable system head end 410, populated titles are flagged according to a variety of different attributes. For example, titles may be flagged as new releases if the content is less than a given age. For another example, titles may be flagged as known sequels to other titles. Similarly, certain titles may be flagged for association with other known titles, for example, where one title is based on another title. Additionally, titles may be flagged with attributes associating certain titles with certain locations. For example, all titles associated with a given location, for example, New York City, may be flagged with an attribute for relating the associated titles to each other. Using the attributes associated with certain titles, a set of titles may be cached at a given hub 420, 425, 430.

According to embodiments of the present invention, a particular set of titles cached at a given hub may be based on different attributes applied to the titles populated at the cable system head end 410. For example, all new releases may be cached at the hub 420 for provision to cable services customers associated with the hub 420. For another example, if the hub 425 is located in San Diego, Calif., the set of titles cached at the hub 425 may include new releases and all titles associated with southern California if previous demand has shown that cable services customers in that location often request titles associated with southern California. For another example, if a given new release is a sequel of a previous release, and previous demand has shown that cable services customers typically request the previous release before or after viewing a sequel release, then the previous release may be cached at hubs along with the sequel release. As should be understood, the foregoing examples are in no sense limiting of the vast number of combinations of video-on-demand titles that may be cached at a given hub 420, 425, 430.

According to one embodiment of the present invention, a preferred hub cache will allow approximately 80 percent of requested titles to be streamed from cached titles at a given hub while the remaining approximately 20 percent of requested titles are streamed directly from the cable services head end 410. As should be understood, the ratio of cached titles versus titles streamed from the head end 410 may vary according to the demands of individual cable services customers associated with different hubs 420, 425, 430.

If a given title that is not cached at a hub is requested by cable services customers from a given hub 420, 425, 430 more than a threshold number of times (N) during a given period, for example, M hours, the requested title may be retrieved from the cable system head end and may be cached at the requesting hub. For example, if cable services customers associated with the hub 425 request a particular title that has not been cached at the hub 425 more than ten times during a given eight hour viewing period, the hub 425 may automatically retrieve the requested title from the cable services head end 410 for adding to the cached titles already stored at the hub 425. For example, an event reported in the news on a given day, for example, the passing of a famous motion picture actor, may trigger a high demand for titles associated with the passing motion picture actor. Once requests for titles associated with the actor exceed a threshold number during a given viewing period, it may become apparent that the most efficient use of cable system assets requires that the requested titles be cached at the associated hubs.

According to embodiments of the present invention, if a given title that is cached at a given hub 420, 425, 430 is not requested by cable services customers according to a threshold number of requests during a given viewing period, that title may be deleted from storage at one or more hubs. For example, if a new release title that has been cached at one or more hubs has not proven to be a popular release, and no requests for the release are received from cable services customers during a given viewing period, a determination may be made that the particular new release title should be removed from cache to provide storage capacity at associated hubs for other titles not previously cached at the hubs.

Figure 5:
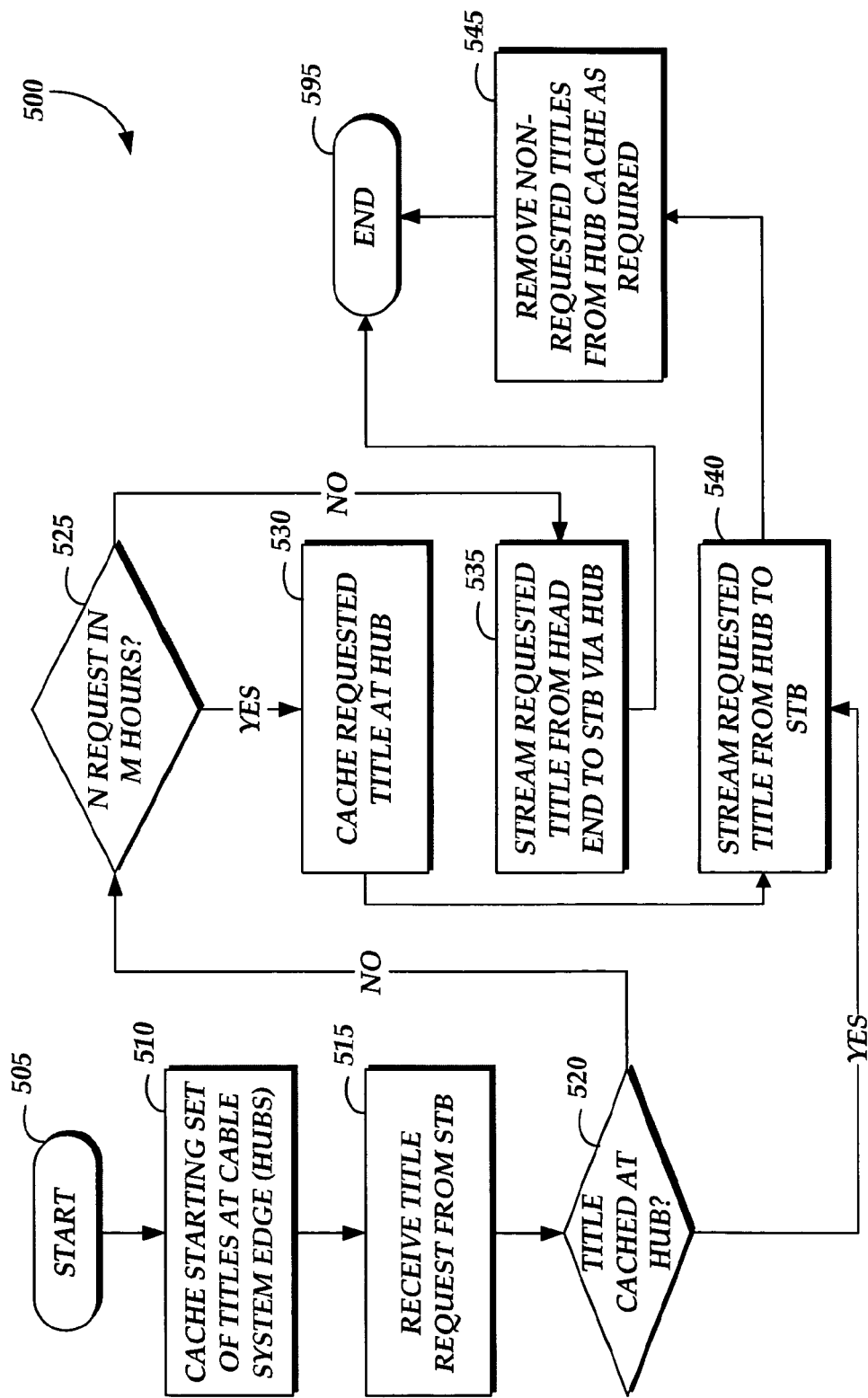
FIG. 5 is a flow diagram illustrating an illustrative routine for intelligently managing video-on-demand assets in a cable services system.

Having described an exemplary operating environment and aspects of the present invention with respect to FIG. 4 above, FIG. 5 is a flow diagram illustrating an illustrative routine for intelligently managing on-demand assets in a cable services system. The routine 500 begins at stop block 505 and proceeds to block 510 where a starting set of on-demand titles are cached at the cable system edge (hubs) at one or more cable system hubs 420, 425, 430, as described above. At block 515, a cable services customer selects a particular on-demand title at his/her television set via a set-top box/television combination 440, 446, 452 via the HFC network 435. At block 520, a determination is made as to whether the selected or requested title has been cached at the hub associated with the requesting customer. If the requested title has been cached, as described above, the routine proceeds to block 540, and the requested title is streamed from the associated hub directly to the set-top box/television combination 440, 446, 452 operated by the requesting customer.

Referring back to block 520, if the requested title is not cached at the hub associated with the requesting customer, the routine proceeds to block 525, and a determination is made as to whether the request made by the customer meets a threshold number of requests for the particular title during a given viewing period set by the cable services system. If not, the requested title is not cached at the associated hub, and the routine proceeds to block 535. At block 535, the requested title is streamed directly from the cable services head end 410 to the requesting customer's set-top box/television combination 440, 446, 452 via the associated hub 420, 425, 430.

Referring back to block 525, if the present request meets a threshold number of requests for the particular title during a given viewing period, as established by the cable services provider, the routine proceeds to block 530, and the requested title is retrieved from the cable system head end 410 by the associated hub 420, 425, 430. The requested title is then cached at the requesting hub for provision to the requesting customer and to other requesting customers. The routine then proceeds to block 540, and the requested title is streamed to the requesting customer from the associated hub at which the requested title is now cached.

At block 545, a determination is made at the one or more hubs comprising the cable services system as to whether any non-requested titles should be removed from cache where any one or more titles have not been requested during given viewing periods as established by the cable services system. Any titles that have not been requested a sufficient number of times as set by the cable services provider are removed from cache, as required, from one or more hubs 420, 425, 430. The routine ends at block 595.

Figure 6:
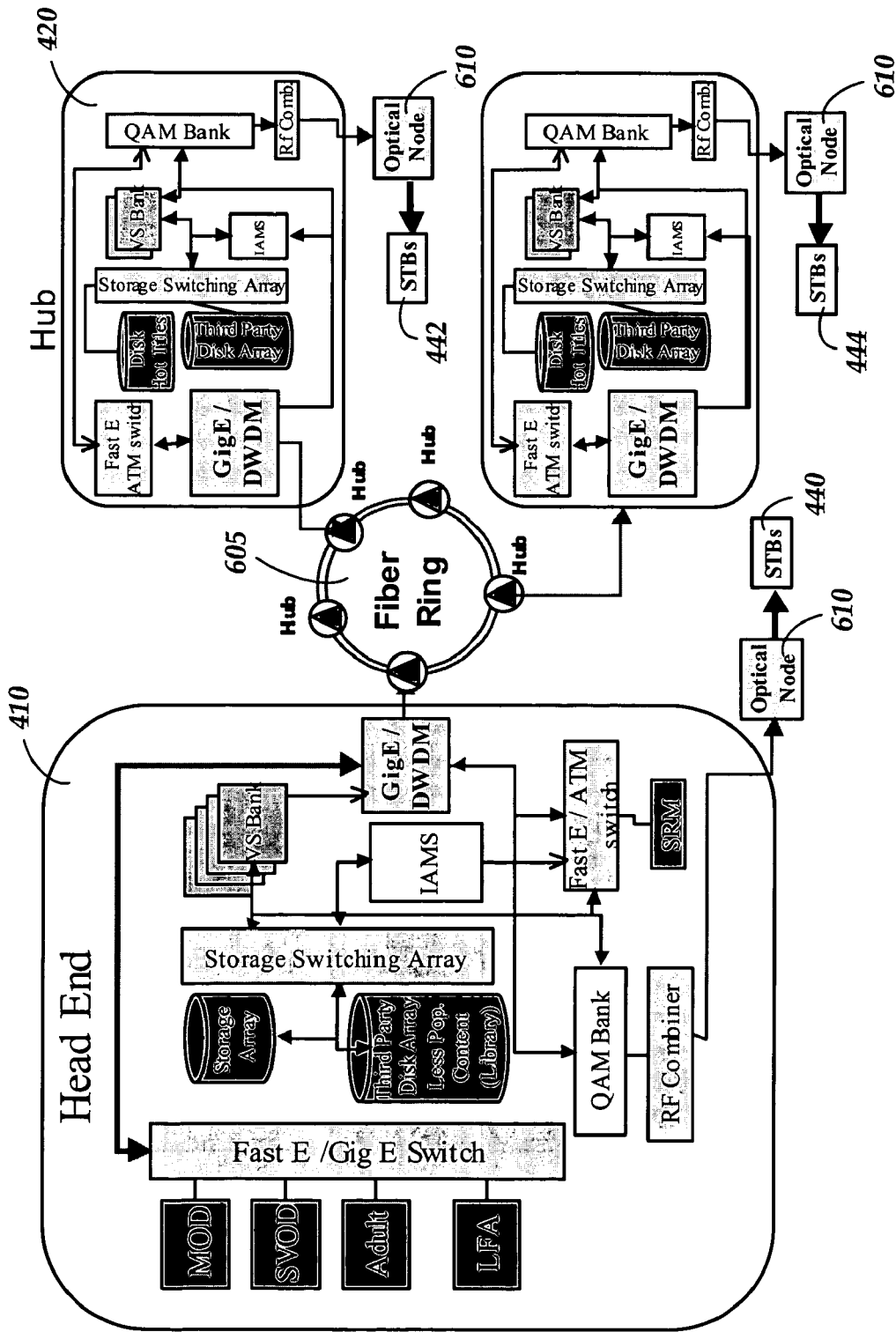
FIG. 6 is a simplified block diagram illustrating a predictive propagation architecture in a cable services network according to embodiments of the present invention.

According to embodiments of the present invention, varying approaches to propagation, storage and bandwidth may be utilized to allow an increase in the amount of content choices available to consumers. According to one embodiment a predictive propagation method may be utilized. Referring to FIG. 6, predictive propagation is a method for propagating content throughout the network utilizing the content metadata and content usage patterns to determine how and where the content gets propagated. A predictive propagation architecture of the present invention includes the following features. Prioritized "load" of content to VOD servers, which includes the load content directly to VOD server disk array (third party or resident drives) from content aggregation devices (e.g., content catcher, etc.). Prioritized loading is allowed based on business rules (e.g., minimum time to availability window, specific content type always given load priority, etc.). Popularity is predicted via statistical algorithms. Dynamic distribution of assets across a network is based on predictions and usage. Determination of placement of content via statistical algorithms is continuously updated to reflect actual usage history, for example, use scheduling based on available hub storage and bandwidth and garbage collection at hubs. Algorithms must take into account a number of variables, including the day of week, the time of day, the content bandwidth requirements, expected take rates, decay patterns of content types, and the like.

The ability to predict popularity and placement of assets is highly dependent upon the existence of accurate, consistent, and meaningful metadata. Popular content is distributed as determined by an algorithm, described above, onto local server storage systems. The server software distributes the "handed-off" content across the disk arrays as deemed appropriate based upon expected usage criteria. Content propagation is scheduled to occur based upon network resource information (e.g., available link bandwidth, storage capacity at hub, business rules, etc.) to ensure that storage at the hubs is minimized (i.e. lead time before availability window) while streams generated from hub storage are maximized (i.e., Local VOD servers handle approximately 80% of total demand at a given hub site). A statistical threshold algorithm is used to determine when and from where (i.e., head end or Hub) to propagate content to a specific hub site, and when content is to be deleted due to diminished popularity. According to embodiments, usage patterns indicate that approximately 20% of total request volume of non-menu related assets can be attributed to library-type content. So, if the system is designed for approximately 10% simultaneous peak usage, then approximately 20% of that amount (or 2% simultaneous peak usage) should be allocated for head end to hub streaming. Propagation bandwidth is dependent upon a number of variables, including the load balancing algorithm, the popularity prediction algorithm, the number of hours of content that exceeds thresholds for load balancing and popularity, and the worst-case for the amount of content that exceeds those thresholds in any given time period.

Referring to FIG. 6, according to this embodiment, content enters the system at the head end 410 (diagram left side) and starts its distribution through the Fast Ethernet (100 Mb/s)/Gigabit Ethernet (FastE/GigE) switch. It is distributed through the head end system by the intelligent asset management system (IAMS), illustrated in FIG. 6 and described above. The initial propagation of content is to the library VOD server. The JAMS determines the popularity of the content and predicts where in the system the content is to be propagated. Initially, all new movie title content (new releases) are propagated to all hubs 420. The timing of this propagation will depend upon the network bandwidth consumption and rates. All content is propagated using the JAMS algorithms, as described above, which are based upon meaningful content metadata, including release dates, title type and genre, and descriptions. The LAMS algorithms utilize all possible metadata to determine the likelihood of a specific demographic requesting the title, whether that title is a movie, music, game, or interactive application. When hub propagation occurs, data enters the hub 420 and is directed to the storage array through the content manager at the hub. The JAMS determines whether this data should supplant other data at the hub. Supplanted content is still available from the library server if needed.

Figure 7:
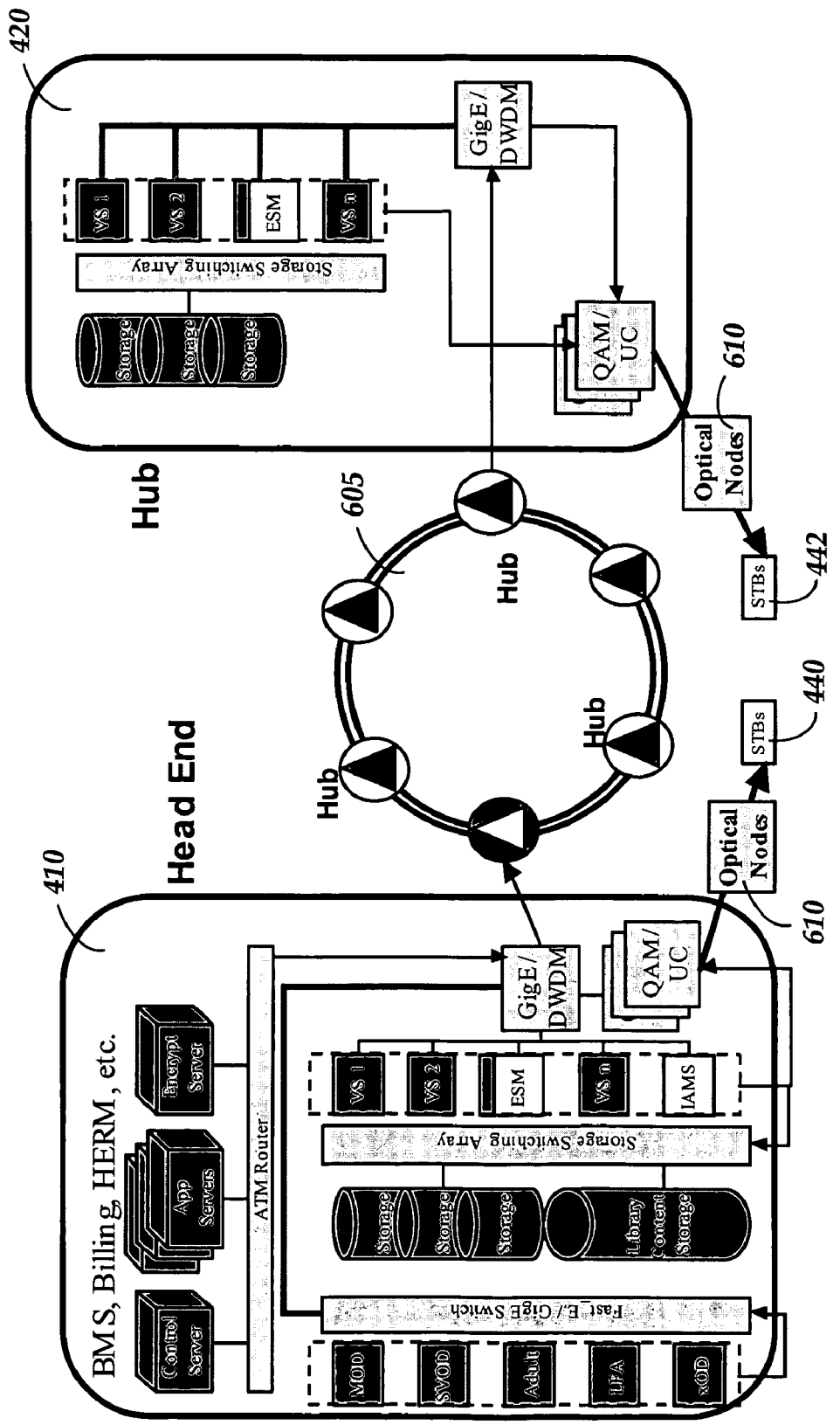
FIG. 7 is a simplified block diagram illustrating an on-demand Simultaneous Propagation and Streaming architecture in a cable services network according to embodiments of the present invention.

According to another embodiment of the present invention, another approach to propagation, storage and bandwidth may be utilized to allow an increase in the amount of content choices available to consumers. Referring to FIG. 7, an on demand simultaneous propagation and streaming approach is illustrated and described. The on demand simultaneous propagation and streaming approach is a store-and-forward method of edge server caching that stores to disk and caches content for streaming at the same time, then removes that edge content based on storage availability (that is, when a new title comes in, the least recently used titles get bumped). The basic functional requirements for this method (which is also referred to as the "caching" method), include loading content directly to the library disk array same as in predictive propagation, described above, receiving requests for content come from subscribers, and causing the content to be streamed from the head end (for the initial request) and cached by the hub servers. According to this embodiment, content is continuously streamed and is propagated at given stream rates throughout network. Cached versions of content only are streamed from the hubs. In the case of a cached content store at the hub, the head end server does not need to stream. The least recently used (LRU) copy of any content is bumped from the hub whenever there is contention for hub resources.

Referring to FIG. 7, according to this embodiment, on-demand content enters the head end 410 and flows through the Fast Ethernet or Gigabit Ethernet switch into the various network elements. The everything (content) on demand (EOD) server manager component manages the distribution of content through the storage-switching array. The algorithms to decide which content gets placed directly onto the network versus that which is only stored centrally are in the IAMS server component. Additional hardware or software is only required if the content load capacities of the video servers is inversely proportional to the stream load. This component guarantees a minimization of head end to Hub bandwidth via prediction. Content propagation terminates at the edge. On-demand store-and-forward propagated content storage at the edge ultimately gets delivered via EOD servers to consumers. According to this embodiment, content is distributed as it is used; no separate propagation network or reservation of bandwidth is required; no dependence on content metadata is required; and a reduction of streaming bandwidth and required stream capacity at the head end are achieved.

According to another embodiment of the present invention, another approach to propagation, storage and bandwidth may be utilized to allow an increase in the amount of content choices available to consumers. According to this embodiment, on demand simultaneous propagation and streaming with partial predictive propagation is illustrated and described, and combines the predictive method with the caching method, described above with reference to FIGS. 6 and 7, to allow for intelligent initial propagation to the edge, smart garbage collection at the edge, and bandwidth optimization throughout the network to avoid the constant streaming issues associated with the caching method. Basically, the functional requirements for this type of architecture are a combination of the requirements for the cached method, with the addition of intelligent propagation from the predictive method.

According to embodiments of the present invention, intelligent asset management handles the disparate media types for an everything-on-demand architecture. For example, high definition video on demand (HD-VOD) may create extreme peaks of bandwidth during prime viewing hours. IAMS will provide the right mix of bandwidth availability to handle these peak demands. For another example, JAMS will enable a switched broadcast setup to insure availability of the most popular broadcast content. For another example, on demand content coming from extranets or managed content portals requires speed of transport to provide a viable user experience. JAMS will enable the availability of bandwidth for those popular applications to be able to utilize dynamic carousels successfully. In addition, IAMS will enhance the distribution of content to multiple vendors of VOD hardware and software. For another example iTV applications may be directed by JAMS to be located in the hubs where they are most used. Data for iTV applications may be tailored to usage patterns for the applications. For another example, gaming applications and data may be tailored to usage patterns garnered from application metadata. IAMS will allow the gaming application sufficient bandwidth for multi-player data collection and distribution. In addition, in the context of global system resource management systems, IAMS may manage bandwidth requirements from head end to hub.

As described herein, embodiments of the present invention provide for intelligent management of on-demand content assets of a cable services system. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. In a cable services system, a method for managing on-demand content, the method comprising:
   populating a cable services system head end with a plurality of on-demand video programs;
   determining a subset of the plurality of on-demand video programs to be distributed to at least one cable services system hub;
   distributing the subset of the plurality of on-demand video programs to the at least one cable services system hub, wherein distributing the subset of the plurality of on-demand video programs to the at least one cable services system hub comprises predictively propagating content to the at least one cable services system hub based on the following: content metadata, content usage patterns, prioritized load distribution, and statistical algorithms comprising functions of variable content bandwidth requirements;
   caching the subset of the plurality of on-demand video programs at the at least one cable services system hub for provisioning the cached on-demand video programs comprising the subset to cable services customers associated with the at least one cable services system hub;
   receiving a request for a given on-demand video program at the at least one cable services system hub;
   if the requested on-demand video program is cached at the at least one cable services system hub, streaming the requested on-demand video program from the at least one cable services system hub to a requesting cable services customer;
   calculating a given period of time based upon the following: an expected number of hours of popular content within each service type, an average time a given title remains popular, a number of services, a refresh rate for each service, and an average time prior to start of availability window for popular content;
   if the requested on-demand video program is not cached at the at least one cable services system hub, determining whether the request for the given on-demand video program meets a threshold number of requests for the given on-demand video program during the given period of time; and
   if the request for the given on-demand video program meets the threshold number of requests during the given period of time, caching the requested on-demand video program at the at least one cable services system hub, the threshold number of requests and the given period of time each being selected to cause at least 80% of requests for on-demand video programs at the at least one cable services system hub to be serviced from the at least one cable services system hub.

2. The method of claim 1, further comprising if the requested on-demand video program is not cached at the at least one cable services system hub, streaming the requested on-demand video program from the cable services system head end to the requesting cable services system customer via the at least one cable services system hub.

3. The method of claim 1, after receiving the request for the given on-demand video program at the at least one cable services system hub, determining whether the requested on-demand video program is cached at the at least one cable services system hub.

4. The method of claim 2, prior to streaming the requested on-demand video program from the cable services system head end to the requesting cable services customer, passing a request for the requested on-demand video program from the at least one cable services system hub to the cable services system head end.

5. The method of claim 1, further comprising if any one of the cached on-demand video programs is not requested by any of the cable services customers during a given period of time, deleting the one cached on-demand video program from a cache of the subset of the plurality of on-demand video programs stored at the at least one cable services system hub.

6. The method of claim 1, further comprising if any one of the cached on-demand video programs is not requested at least the threshold number of times during the given period of time, deleting the one cached on-demand video program from a cache of the subset of the plurality of on-demand video programs stored at the at least one cable services system hub.

7. The method of claim 1, wherein determining the subset of the plurality of on-demand video programs that are presently in demand includes predicting in the subset at least one new release on-demand video program, wherein the at least one new release on-demand video program is flagged as a new release if the at least one new release on-demand video program is less than a given age.

8. The method of claim 1, wherein determining the subset of the plurality of on-demand video programs that are presently in demand includes predicting in the subset at least one requested on-demand video programs that is requested by cable services customers associated with a particular cable services system hub.

9. The method of claim 1, wherein determining the subset of the plurality of on-demand video programs that are presently in demand includes predicting in the subset at least one demanded on-demand video programs that is presently in demand relative to other on-demand video programs included in the subset of the plurality of on-demand video programs.

10. The method of claim 1, wherein predictively propagating content to the at least one cable services system hub based on the statistical algorithms comprises predictively propagating content to the at least one cable services system hub based on the statistical algorithms that take into account a number of variables, including a day of week, a time of day, a content bandwidth requirements, expected take rates, and decay patterns of content types.

11. The method of claim 1, wherein calculating the given period of time comprises calculating the given period of time comprising approximately 4 hours.

12. A system for managing on-demand content in a cable services system, the system comprising:
   a cable services system head end operative to:
      store a plurality of video programs for provision to cable services customers;
      generate a subset of the plurality of video programs to be distributed to a cable services system hub;
      distribute the subset of the plurality of on-demand video programs to the cable services system hub by predictively propagating content to the cable services system hub based on the following: prioritized load distribution and statistical algorithms comprising functions of content bandwidth requirements; and
      cache the subset of the plurality of video programs at the cable services system hub for provisioning the cached video programs comprising the subset to the cable services customers associated with the cable services system hub; and
   the cable services system hub operative to:
      receive a request for a given video program from at least one of the cable services customers;

determine whether the requested video program is cached at the cable services system hub;

stream the requested program from the cable services system hub to the at least one requesting cable services customer if the requested video program is cached at the cable services system hub;

calculate a given period of time based upon the following: an expected number of hours of popular content within each service type, an average time a given title remains popular, a number of services, a refresh rate for each service, and an average time prior to start of availability window for popular content;

if the requested video program is not cached at the cable services system hub, the cable services system hub being further operative to determine whether the request for the given video program meets a threshold number of requests for the given video program during the given period of time; and if the request for the given video program meets the threshold number of requests during the given period of time, the cable services system hub being further operative to cache the requested video program at the cable services system hub, the threshold number of requests and the given period of time each being selected to cause at least 80% of requests for on-demand video programs at the at least one cable services system hub to be serviced from the at least one cable services system hub.

13. The system of claim 12, further comprising if the requested video program is not cached at the cable services system hub, the cable services system head end being further operative to stream the requested video program from the cable services system head end to the at least one requesting cable services system customer via the cable services system hub.

14. The system of claim 12, further comprising if any one of the cached on-demand video programs is not requested by any of the cable services customers during a given period of time, the cable services system hub being further operative to delete the one cached on-demand video program from a cache of the subset of the plurality of on-demand video programs stored at the cable services system hub.

15. The system of claim 12, further comprising if any one of the cached on-demand video programs is not requested at least the threshold number of times during the given period of time, the cable services system hub being further operative to delete the one cached on-demand video program from a cache of the subset of the plurality of on-demand video programs stored at the cable services system hub.

16. The system of claim 12, wherein the cable services system head end being operative to calculate the given period of time comprises the cable services system head end being operative to calculate the given period of time comprising approximately 4 hours.

17. A non-transitory computer-readable storage medium having stored thereon computer-executable instructions which when executed by a computer perform a method for managing on-demand content in a cable services system, the method comprising:

generating a subset of a plurality of video programs available from a cable services system head end that are presently in demand by cable services customers;

distributing the subset of the plurality of on-demand video programs to a cable services system hub, wherein distributing the subset of the plurality of on-demand video programs to the cable services system hub comprises predictively propagating content to the cable services system hub based on statistical algorithms comprising functions of content bandwidth requirements, a day of week, and a time of day;

caching the subset of the plurality of video programs at the cable services system hub for provisioning the cached video programs comprising the subset to the cable services customers associated with the cable services system hub;

in response to receiving a request for a given video program at the cable services system hub, streaming the requested video program from the cable services system hub to a requesting cable services customer if the requested video program is cached at the cable services system hub;

if the requested video program is not cached at the cable services system hub, streaming the requested video program from the cable services system head end to the requesting cable services system customer via the cable services system hub;

calculating a given period of time based upon the following: an expected number of hours of popular content within each service type, an average time a given title remains popular, a number of services, a refresh rate for each service, and an average time prior to start of availability window for popular content;

if the requested video program is not cached at the cable services system hub, determining whether the request for the given video program meets a threshold number of requests for the given video program during a given period of time; and if the request for the given video program meets the threshold number of requests during the given period of time, caching the requested video program at the cable services system hub, the threshold number of requests and the given period of time each being selected to cause at least 80% of requests for on-demand video programs at the at least one cable services system hub to be serviced from the at least one cable services system hub.

18. The non-transitory computer-readable storage medium of claim 17, prior to streaming the requested video program from the cable services system head end to the requesting cable services customer, passing a request for the requested video program from the cable services system hub to the cable services system head end.

19. The non-transitory computer-readable storage medium of claim 17, further comprising if any one of the cached on-demand video programs is not requested by any of the cable services customers during a given period of time, deleting the one cached on-demand video program from a cache of the subset of the plurality of on-demand video programs stored at the cable services system hub.

20. The non-transitory computer-readable storage medium of claim 17, further comprising if any one of the cached on-demand video programs is not requested at least the threshold number of times during the given period of time, deleting the one cached on-demand video program from a cache of the subset of the plurality of on-demand video programs stored at the cable services system hub.

* * * * *